(12) United States Patent
Meuser et al.

(10) Patent No.: US 8,153,011 B2
(45) Date of Patent: Apr. 10, 2012

(54) METHOD FOR SEPARATING OFF COLORING COMPONENTS FROM AQUEOUS PLANT EXTRACTS

(75) Inventors: Friedrich Meuser, Berlin (DE); Ingo Bauer, Neu-Isenburg (DE)

(73) Assignee: Bayer Cropscience AG, Monheim Am Rhein (DE)

( * ) Notice: Subject to any disclaimer, the term of this patent is extended or adjusted under 35 U.S.C. 154(b) by 715 days.

(21) Appl. No.: 12/298,659

(22) PCT Filed: Apr. 27, 2007

(86) PCT No.: PCT/EP2007/004027
§ 371 (c)(1),
(2), (4) Date: Oct. 27, 2008

(87) PCT Pub. No.: WO2007/128558
PCT Pub. Date: Nov. 15, 2007

(65) Prior Publication Data
US 2009/0095687 A1    Apr. 16, 2009

Related U.S. Application Data

(60) Provisional application No. 60/796,838, filed on May 2, 2006.

(30) Foreign Application Priority Data

Apr. 28, 2006  (EP) .................................. 06090065

(51) Int. Cl.
*C02F 1/52*  (2006.01)
*C02F 103/32*  (2006.01)

(52) U.S. Cl. ........ 210/726; 210/724; 210/737; 210/917; 426/255; 426/260

(58) Field of Classification Search ............... 210/724
See application file for complete search history.

(56) References Cited

U.S. PATENT DOCUMENTS

| 1,816,394 | A |   | 7/1931  | Müller et al. |         |
|-----------|---|---|---------|---------------|---------|
| 3,009,873 | A | * | 11/1961 | Kerr et al.   | 210/725 |
| 3,947,353 | A | * | 3/1976  | Lehmann et al.| 210/725 |
| 4,137,163 | A | * | 1/1979  | Young         | 210/706 |
| 4,676,912 | A | * | 6/1987  | Eckler        | 588/318 |
| 5,614,102 | A | * | 3/1997  | Sakurada      | 210/718 |
| 6,153,100 | A | * | 11/2000 | Mitchell      | 210/634 |
| 7,282,150 | B2| * | 10/2007 | Kuriki et al. | 210/634 |

FOREIGN PATENT DOCUMENTS

WO  WO 2007/128559  11/2007
WO  WO 2007/128560  11/2007

* cited by examiner

*Primary Examiner* — Peter A Hruskoci
(74) *Attorney, Agent, or Firm* — Hunton & Williams LLP

(57) ABSTRACT

The invention relates to a method for separating off coloring components from aqueous plant extracts in which magnesium ions ($Mg^{2+}$) are added to the plant extract, at least one alkaline component is added to the plant extract, a precipitate is formed, and the precipitate formed is separated off from the plant extract.

18 Claims, No Drawings

METHOD FOR SEPARATING OFF COLORING COMPONENTS FROM AQUEOUS PLANT EXTRACTS

CROSS-REFERENCE TO RELATED APPLICATIONS

This application is the U.S. National Stage filing of International Application No. PCT/EP2007/004027, filed Apr. 27, 2007, which claims priority to EP 06090065.1, filed Apr. 28, 2006 and U.S. Provisional Patent Application No. 60/796,838, filed May 2, 2006, the disclosures of each of which are hereby incorporated by reference.

BACKGROUND OF THE INVENTION (i) Field of the Invention

The present invention relates to a method for separating off coloring components from aqueous plant extracts and also to the use of magnesium salts for separating off coloring components from aqueous plant extracts.

(ii) Description of the Related Art

In the isolation of valuable constituents from plants, routinely aqueous extraction is used. In this case, generally, plant material is comminuted and extracted with warm water with stirring. The extracts thus produced are frequently colored deep brownish-yellow owing to their content of tannins and flavonoids, for which reason the constituents directly isolatable from such extracts in no way correspond to the desired requirements with respect to a neutral color.

The above-described problem occurs, for example, in the isolation of inulin from artichokes. Decolorization attempts following the decolorization method employed in the isolation of sucrose from sugarbeets for extracts from beets by addition of chalk and subsequent carbonation ($CO_2$ addition) do not proceed satisfactorily. Equally, the possible use of ion exchange resins for decolorizing the extracts is excluded owing to the high cost required therefor.

SUMMARY OF THE INVENTION

The object of the present invention is to develop an effective decolorization method for plant extracts which can be carried out using inexpensive aids and also with low expenditure on apparatus and time, and from which color-neutral products can be isolated.

To achieve this object, the present invention provides a method and specific advantageous embodiments of the method.

DETAILED DESCRIPTION OF THE INVENTION

The invention comprises a method for separating off coloring components from aqueous plant extracts which comprises
a) adding magnesium ions ($Mg^{2+}$) to the plant extract,
b) adding at least one alkaline component to the plant extract,
c) forming a precipitate, and
d) separating off from the plant extract the precipitate formed.

This method makes possible a surprisingly effective decoloration of aqueous plant extracts.

Inter alia, the method is particularly effective in the decolorization of extracts from artichokes, in particular from artichoke roots. This special example, however, does not restrict the field of application of the invention in any way.

In addition, the method is distinguished in that the aids used, such as magnesium salts and alkalis, are inexpensive.

Also, the expenditure on apparatus and time in carrying out the method is particularly low.

Finally, by means of this type of decolorization, haze materials are also simultaneously removed from the liquid extract, so that separate removal of haze materials is not necessary.

The method according to the invention for separating off coloring components from plant extracts is generally also termed decolorization, clarification or "fining" of plant extracts. These terms are equivalent in the context of the present invention.

Coloring components are taken to mean all those components of a plant extract which are not color-neutral and color a plant extract in any desired color. Usually this relates to green, yellow and brown colors and mixtures of such colors which are present in plant extracts after the aqueous extraction step from plant material. The method, however, is not restricted to special colors.

The coloring components can be present in solution, in suspension or in emulsion, or simultaneously in a plurality of these forms. Preferably, they are dissolved components.

The coloring components of the plant extract are preferably tannins and/or flavonoids which can be separated off particularly well by the method according to the invention.

The abovementioned aqueous plant extracts are isolated, for example, by an aqueous extraction of comminuted plant material, the extraction usually being carried out with warmed water. The plant material can consist, for example, of roots, stems, leaves, blossoms and fruits, or a mixture of these materials.

The plant variety on which the method can be employed is not particularly restricted. For instance, the method can be advantageously employed for all plants in which an aqueous extraction is carried out to isolate its constituents, and in which corresponding tannins and flavonoids occur.

It has been found that the method according to the invention is particularly advantageously applicable to aqueous artichoke extracts and still more especially in extracts from artichoke roots.

Fructans, in particular inulin, may be isolated from such artichoke extracts. Thus the present method is particularly readily applicable as an intermediate step in fructan isolation from artichokes, in particular in inulin isolation from artichokes.

According to the invention magnesium ions ($Mg^{2+}$) are added to the aqueous plant extract. In a variant of step a) it is possible to add an aqueous solution of a magnesium salt to the plant extract. In a further, more preferred variant, a magnesium salt in solid form is added directly to the plant extract and dissolved therein.

When a magnesium salt is added, it is preferably a salt which, owing to its high solubility product in water, is very readily soluble. Particularly highly suitable magnesium salts are selected from magnesium chloride, magnesium sulfate, magnesium nitrate, the salts of other lower fatty acids, such as magnesium acetate and magnesium propionate, and mixtures thereof.

An alkaline component according to the invention is taken to mean a component which contains hydroxide ions ($OH^-$) or, after combination with the plant extract, forms hydroxide ions in the extract. The alkaline component can be liquid, solid or gaseous. Preferably, use is made of a liquid alkaline component.

On addition of magnesium ions and an alkaline component as described in steps a) and b) of the method, a precipitate is formed by a precipitation reaction. Steps a) and b), in the context of the present method, can be carried out in principle simultaneously, in particular when use is made in step a) of a solution of magnesium ions and in step b) of an alkaline liquid. However, it is preferred to carry out method step a) first and subsequently step b).

It is advantageous for the method when both the magnesium ions and the alkaline component are distributed as homogeneously as possible in the extract, so that the precipitation reaction in the extract is also homogeneous and as quantitative as possible. Therefore, it is preferred, as alkaline component, to make use of aqueous alkaline liquids, such as, for example, alkaline solutions alkaline suspensions which may be mixed into the plant extract rapidly and homogeneously. An alkaline solution or suspension contains according to the invention hydroxide ions ($OH^-$) or forms such after combination with the plant extract.

In a very preferred method variant, in step a) a magnesium salt is first dissolved homogeneously in the extract. Subsequently, in step b), an aqueous alkaline solution or suspension is added, preferably with intensive stirring.

In an embodiment, the alkaline component is an aqueous solution or suspension of an alkali metal hydroxide or alkaline earth metal hydroxide. The hydroxide is preferably selected from lithium hydroxide, sodium hydroxide, potassium hydroxide, barium hydroxide and calcium hydroxide.

In a very particularly preferred variant, the alkaline component is a suspension of calcium hydroxide. The advantage of the use of calcium hydroxide is that a particularly small amount of centrifugate is obtained in step c) of the method. In addition, by means of the simultaneous precipitation of magnesium hydroxide and calcium sulfate, a higher sedimentation rate and a higher compactability of the precipitate are achieved. A gel-like consistency of the precipitate is expressed to a particularly low extent. As a result, in this method variant, the binding of unwanted constituents, such as, for example, inulin, in the precipitate is particularly low.

A further usable alkaline component is ammonia, preferably in aqueous solution. The use of gaseous ammonia is also not excluded in principle, but is less preferred than the use of an aqueous solution.

In a further embodiment, the alkaline component is an aqueous solution, emulsion or suspension of an amine, such as ethylenediamine and triethanolamine.

Salts of weak organic acids such as alkali metal acetates and alkaline earth metal acetates, in particular sodium acetate, potassium acetate, calcium acetate and magnesium acetate, are also usable.

As precipitate according to the method of the invention, magnesium hydroxide is formed. In this case, according to the invention, the coloring components of the aqueous extract remain in the precipitate and are thus separated from the liquid phase. An essentially decolorized extract is obtained.

How quantitative the decolorization is depends, inter alia, on the amounts of $Mg^{2+}$ ions and alkaline components used and thus on the amount of precipitate formed. The quantitative optimization of the reactants is in the scope of activity of those skilled in the art.

In one embodiment, the entire decolorization method, or substeps thereof, can also be arranged to be multistage, if required.

In the method according to the invention, the molar ratio of hydroxide ions to magnesium ions is preferably for $OH^-$ : $Mg^{2+}$ 2.2:1 to 1.8:1. Most preferably, the ratio is exactly stoichiometric, that is $OH^-:Mg^{2+}=2:1$. The amount of alkaline component is therefore to be selected in such a manner that the corresponding amount of hydroxide ions per magnesium ions is present. The invention, according to accompanying claims, also comprises making use of combinations of the above-described magnesium salts. Likewise, the invention comprises using combinations of the above-described alkaline components.

The dissolution of the magnesium salt and addition of the alkaline components in method steps a) and b) preferably proceed with stirring, in order to achieve the most rapid possible dissolution or homogenization and thus a rapid reaction. The mixing technique, however, moreover, is not particularly restricted. For instance the method can also be carried out, for example, by other mixing techniques familiar to those skilled in the art.

To accelerate the method, step a) of the method is preferably carried out at a temperature of 60-80° C. The reaction time after addition of the alkaline component is generally approximately 1 to 15 min, on average approximately 10 min.

The separation step d) of the method according to the invention preferably proceeds by sedimentation, filtration or centrifugation, by means of a separator, such as, for example, a desludging separator. However, other separation techniques familiar to those skilled in the art can also be used.

The invention will be described below on the basis of special embodiments, which, however, are in no way to be taken to mean a restriction of the general inventive concept.

EXAMPLES

Example 1

Decolorization by Means of Magnesium Sulfate and Sodium Hydroxide

Magnesium hydroxide formation by means of magnesium sulfate and sodium hydroxide proceeds according to the following equation:

$$MgSO_4 \cdot 7H_2O + 2NaOH \rightarrow Mg(OH)_2 + Na_2SO_4 + 7H_2O \quad \text{(equation 1)}$$

Table 1 shows the required amounts of magnesium sulfate heptahydrate and sodium hydroxide which are required to form magnesium hydroxide amounts of 0.1-1.0 g/100 ml of extract.

TABLE 1

Stoichiometric amounts of the reaction partners for $Mg(OH)_2$ formation

| | $Mg(OH)_2$ [g/100 ml] (theoretical value) | | | | | | | | | |
|---|---|---|---|---|---|---|---|---|---|---|
| | 0.10 | 0.20 | 0.30 | 0.40 | 0.50 | 0.60 | 0.70 | 0.80 | 0.90 | 1.00 |
| $Mg_2SO_4 \cdot 7H_2O$ [g/L] | 4.23 | 8.46 | 12.68 | 16.91 | 21.14 | 25.37 | 29.60 | 33.83 | 38.05 | 42.28 |
| NaOH [g/L] | 1.37 | 2.74 | 4.12 | 5.49 | 6.86 | 8.23 | 9.61 | 10.98 | 12.35 | 13.72 |

Decolorization experiment by formation of 0.5 g of Mg(OH$_2$)/100 ml of extract on a laboratory scale:

400 ml of dark brown extract from artichoke roots were warmed to 60° C. and 8.4 g of MgSO$_4$.7H$_2$O were dissolved therein with stirring.
  To this were added 8.0 g of 33% strength NaOH and the mixture was stirred for 10 min. A pH of 9.7 was established.
  The mixture was centrifuged for 10 min at 5500 g in a beaker centrifuge.
  After this separation, approximately 350 ml of a water-clear extract were obtained, which extract was light-yellow in a 5 cm thick layer. As centrifugate, 55.1 g of a gel-like pellet were obtained.

Example 2

Decolorization by Means of Magnesium Sulfate and Calcium Hydroxide

Magnesium hydroxide formation proceeds with magnesium sulfate and calcium hydroxide according to the following equation:

$$MgSO_4 \cdot 7H_2O + Ca(OH)_2 \rightarrow Mg(OH)_2 + CaSO_4 + 7H_2O \quad \text{(equation 2)}$$

Table 2 shows the required amounts of magnesium sulfate heptahydrate and calcium hydroxide which are required to form magnesium hydroxide amounts of 0.1-1.0 g/100 ml of extract.

TABLE 2

Stoichiometric amounts of the reaction partners for Mg(OH)$_2$ formation

| | Mg(OH)$_2$ [g/100 ml] (theoretical value) | | | | | | | | | |
|---|---|---|---|---|---|---|---|---|---|---|
| | 0.10 | 0.20 | 0.30 | 0.40 | 0.50 | 0.60 | 0.70 | 0.80 | 0.90 | 1.00 |
| Mg$_2$SO$_4$·7H$_2$O [g/L] | 4.23 | 8.46 | 12.68 | 16.91 | 21.14 | 25.37 | 29.60 | 33.83 | 38.05 | 42.28 |
| Ca(OH)$_2$ [g/L] | 1.27 | 2.55 | 3.82 | 5.09 | 6.36 | 7.64 | 8.91 | 10.18 | 11.45 | 12.73 |

Decolorization experiment by formation of 0.5 g of Mg(OH$_2$)/100 ml of extract on a laboratory scale.

400 ml of dark brown extract from artichoke roots were warmed to 60° C. and 8.4 g of MgSO$_4$.7H$_2$O were dissolved therein with stirring.
  To this were added 2.63 g of 96% strength Ca(OH)$_2$ as suspension in 5 ml of water and the mixture was stirred for 10 min. A pH of 9.5 was established.
  The mixture was centrifuged for 10 min at 5500 g in a beaker centrifuge.
  After this separation, approximately 375 ml of a water-clear extract colored light yellow were obtained in a 5 cm-thick layer. As centrifugate, 28.3 g of a thick-pasty pellet were obtained.

The advantage of using calcium hydroxide as alkali is clear by the smaller amount of centrifugate after centrifugation compared with the significantly greater amount of centrifugate in the use of sodium hydroxide (see use examples 1 and 2). Owing to the simultaneous precipitation of magnesium hydroxide and calcium sulfate (compare equation 2), a greater sedimentation rate and a higher compactability of the precipitate are achieved. The gel-like consistency of the precipitate is less clearly expressed. Thus the loss of inulin by fining reduces. On a pilot plant scale, the precipitate can readily be separated off by means of a disk separator.

Example 3

Two-Stage Decolorization by Formation of a Total of 0.7 g of Mg(OH$_2$)/100 ml of Extract on a Pilot Plant Scale 3400 g of MgSO$_4$.7H$_2$O (equivalent to 0.5 g of Mg(OH$_2$)/100 ml of extract) were dissolved in approximately 170 L of dark brown extract from artichoke roots, with stirring within 10 min.

To this were added 1015 g of 96% strength Ca(OH)$_2$ as a suspension in 3 L of water and stirred for 10 min. A pH of 9.4 was established.

The entire precipitation mixture was clarified quantitatively in the course of 120 min in the disk separator. The decolorized extraction solution (150 L) was free from light-yellow color and free from haze material. As sludge fraction, 20 L of a thick-pasty solid phase was obtained.

Using the resultant extraction solution (150 L), the entire decolorization step was repeatedly carried out using 1350 g of MgSO$_4$.7H$_2$O (equivalent to 0.2 g of Mg(OH$_2$)/100 ml of extract) and 410 g of 96% strength Ca(OH)$_2$ as a suspension in 1.5 L of water.

The entire precipitation mixture was clarified quantitatively in the course of 30 min in the disk separator. The decolorized extraction solution (145 L) having pH of 9.4 was water-clear, light yellow and free from haze materials. As sludge fraction, 7 L of a thick-pasty centrifugate were obtained.

The invention claimed is:

1. A method for separating off coloring components from aqueous plant extracts comprising a) adding magnesium ions (Mg$^{2+}$) to the plant extract, b) adding at least one alkaline component to the plant extract, said alkaline component comprising hydroxide ions (OH$^-$) or, after combination with the plant extract forms hydroxide ion in the extract, c) forming a precipitate comprising magnesium hydroxide and off coloring components, and d) separating from the plant extract the precipitate formed.

2. The method of claim 1, wherein steps a) and b) are carried out with stirring.

3. The method as of claim 1, wherein the precipitate formed is separated off from the plant extract by sedimentation or filtration.

4. The method of claim 1, wherein, in step a), a magnesium salt is added.

5. The method of claim 4, wherein the magnesium salt is magnesium chloride, magnesium sulfate, magnesium acetate, or magnesium nitrate.

6. The method of claim 4, wherein the magnesium salt is magnesium sulfate.

7. The method of claim 1, wherein step a) is carried out at a temperature of 60-80° C.

8. The method of claim 1, wherein the amount of alkaline component is selected in such as manner as to set a molar ratio OH$^-$:Mg$^{2+}$ of 2.2:1-1.8:1.

9. The method of claim 1, wherein the alkaline component is an aqueous solution or suspension of an alkali metal hydroxide or alkaline earth metal hydroxide.

10. The method of claim 9, wherein the alkaline component is a suspension of calcium hydroxide.

11. The method of claim 1, wherein the alkaline component is aqueous ammonia.

12. The method of claim 1, wherein the alkaline component is an aqueous solution or suspension of a salt of a weakly organic acid.

13. The method of claim 1, wherein the alkaline component is an amine.

14. The method of claim 13, wherein the amine is ethylenediamine or triethanolamine.

15. The method of claim 1, wherein the coloring components of the plant extract are tannins and/or flavonoids.

16. The method of claim 1, wherein the plant extract is an artichoke extract.

17. The method of claim 16, wherein the artichoke extract is an extract of artichoke roots.

18. The method of claim 1, wherein step a) comprises adding an aqueous solution comprising dissolved magnesium ions.

* * * * *